(12) United States Patent
Chiang et al.

(10) Patent No.: US 11,073,477 B2
(45) Date of Patent: Jul. 27, 2021

(54) EPI-CONE SHELL LIGHT-SHEET SUPER-RESOLUTION SYSTEM AND MICROSCOPE

(71) Applicant: NATIONAL TSING HUA UNIVERSITY, Hsinchu (TW)

(72) Inventors: Ann-Shyn Chiang, Hsinchu (TW); Li-An Chu, Hsinchu (TW); Wei-Kun Chang, Hsinchu (TW); Yen-Yin Lin, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 181 days.

(21) Appl. No.: 16/555,340

(22) Filed: Aug. 29, 2019

(65) Prior Publication Data

US 2020/0284729 A1 Sep. 10, 2020

(30) Foreign Application Priority Data

Mar. 8, 2019 (TW) .................. 108107727

(51) Int. Cl.
| | | |
|---|---|---|
| *G01B 9/04* | (2006.01) | |
| *G01N 21/64* | (2006.01) | |
| *G02B 21/00* | (2006.01) | |
| *G02B 21/02* | (2006.01) | |

(52) U.S. Cl.
CPC ..... *G01N 21/6458* (2013.01); *G02B 21/0072* (2013.01); *G02B 21/02* (2013.01); *G01N 2021/6463* (2013.01)

(58) Field of Classification Search
CPC ......... G01N 21/6458; G01N 2021/001; G01N 2021/6463; G02B 21/0072; G02B 21/02; G02B 21/0032; G02B 21/0076; G02B 21/367; G02B 27/58; G02B 5/001
See application file for complete search history.

(56) References Cited

U.S. PATENT DOCUMENTS

2016/0327779 A1* 11/2016 Hillman ................ G02B 23/04
2019/0302437 A1* 10/2019 Hillman ............ G02B 21/0076

* cited by examiner

*Primary Examiner* — David P Porta
*Assistant Examiner* — Mamadou Faye
(74) *Attorney, Agent, or Firm* — Muncy, Geissler, Olds & Lowe, P.C.

(57) ABSTRACT

An epi-cone shell light-sheet super-resolution system and an epi-fluorescence microscope are provided. The epi-cone shell light-sheet super-resolution system includes a light-emitting element, a lens set, and an objective lens. After passing through the lens set, the excitation light emitted by the light-emitting element is refracted into ring-shaped light and focused on the objective-lens back-focal plane. The objective lens focuses the ring-shaped light to form a ring-shaped light cone which is then focused on the sample position. The ring-shaped light cone has a fixed thickness. In addition, the same objective lens is used for both excitation and imaging, thus achieving an epi-fluorescence microscope.

8 Claims, 6 Drawing Sheets (A)

(B)

(C)

XY

XZ

EPI-CONE SHELL LIGHT-SHEET SUPER-RESOLUTION SYSTEM AND MICROSCOPE

CROSS-REFERENCE TO RELATED APPLICATION

This application claims priority from Taiwan Patent Application No. 108107727, filed on Mar. 8, 2019, in the Taiwan Intellectual Property Office, the content of which is hereby incorporated by reference in its entirety for all purposes.

BACKGROUND OF THE INVENTION

1. Field of the Invention

The present invention relates to an epi-cone shell light-sheet super-resolution system, more particularly to an epi-cone shell light-sheet super-resolution system that generates a ring-shaped light cone, and an epi-fluorescence microscope including the same.

2. Description of the Related Art

In the research of biological tissues nowadays, using optical microscopes to observe is an essential technique. For conventional optical microscopes, samples have to be made into slices and observed with the aid of light source. In the process of making samples for use with a microscope into slices, an inevitable problem is damage to the tissue sample. This tissue damage to the sample in fact can cause problems in viewing the characteristic features of the tissue samples.

However, when sample slices used for observation are sliced too thick, only reflected light can be used to observe the surface while penetrating light can hardly penetrate the sample, leading to difficulties for sample observation and photography. As a solution to these difficulties, fluorescence microscopy has emerged. Fluorescence microscopy fuses sample tissue with fluorescent protein markers or directly dyes the tissue with fluorescent dye for follow-up observation.

Then, a sample with fluorescent substances generates fluorescence after the illumination of the sample with an excitation light. The observer obtains fluorescence images of the sample after collecting these fluorescence signals. However, with the passage of time and the maturation of illumination, the fluorescent substances will mature and will not be able to emit light as effectively. In the case of long-term use, it is possible that fluorescent sample images can no longer be observed due to the depletion of fluorescence from the fluorescent substances within the sample.

The conventional manner (vertical penetration) of sample excitation for the observation of a thick sample, no matter which layer (a position of vertical depth) is observed or used to capture the image of samples, it may simultaneously cause the depletion of fluorescence in the fluorescent substances found in the non-observation layer (i.e., un-focal plane). Consequently, the later the layer being image-capturing, the weaker the signal to be obtained, and in some cases may be indistinguishable from noise.

To solve the aforementioned problem, in current techniques, it is known that the light-sheet microscopy or two-photon microscopy may be used to prevent the depletion of fluorescent substances in the un-focal plane. However, for light-sheet microscopy, a more complicated optical path design is required to only simultaneously excite the fluorescent substances of the entire image-capturing plane. On the other hand, the laser source of the two-photon microscopy is expensive. Hence, limitations may be found in the actual application.

SUMMARY OF THE INVENTION

To solve the aforementioned problem, the purpose of the present invention is to provide an epi-cone shell light-sheet super-resolution system that can excite the fluorescent substances on a specific image-capturing plane to obtain images with deep information and construct stereoscopic images. The structure may also be simplified to decrease the costs for the device.

According to the purpose, the present invention provides an epi-cone shell light-sheet super-resolution system, including a light-emitting element generating a first excitation light; a lens set formed by a plurality of lenses, and the lens set comprising a first lens and a second lens, wherein the first lens is a conical lens, the first lens is positioned between the light-emitting element and the second lens, the first lens is spaced apart from the second lens by a first predetermined distance, a conical surface of the first lens faces away from the light-emitting element and refracts the first excitation light into a ring-shaped excitation light with a fixed thickness, and the second lens focuses the ring-shaped excitation light to an objective lens back-focal plane; a color separation filter configured to reflect the ring-shaped excitation light; and an objective lens as a convex lens positioned between the objective-lens back-focal plane and a sample, expanding the focused ring-shaped excitation light to a sample width, and focusing the ring-shaped excitation light to a sample position; wherein an energy of the ring-shaped excitation light focused before the sample position is lower than an excitation threshold value, and a sum of the energy focused on the sample position is higher than the excitation threshold value.

In a preferred embodiment of the present invention, the epi-cone shell light-sheet super-resolution system may further include a magnifying glass set positioned between the light-emitting element and the lens set, formed by a pair of convex lenses, expanding the first excitation light from a first width to a second width, and collimating the first excitation light.

In another preferred embodiment of the present invention, the second lens of the epi-cone shell light-sheet super-resolution system may include a conical lens and a micro-lens array, and a conical surface of the conical lens faces the first lens and illuminates the ring-shaped excitation light to the micro-lens array after collimation; the micro-lens array respectively focuses the ring-shaped excitation light by a plurality of micro-convex lenses in the micro-lens array to form a plurality of second excitation lights, the plurality of second excitation lights are arranged in a ring shape, and the focuses of the plurality of second excitation lights are positioned at the objective-lens back-focal plane.

In yet another preferred embodiment of the present invention, the micro-lens array is arranged based on closest packing or chessboard packing.

In yet another preferred embodiment of the present invention, the second lens is a convex lens.

In yet another preferred embodiment of the present invention, the light-emitting element may include a color filter configured to change a wavelength of the first excitation light.

The present invention further provides an epi-fluorescence microscope, including the epi-cone shell light-sheet super-resolution system as mentioned, an image-capturing device configured to capture fluorescence emitted from the sample; a microstat positioned at the sample position and bearing the sample; a regulating wheel configured to regulate a height of the microstat; and an eyepiece configured to image to the image-capturing device.

According to the aforementioned statements, the epi-cone shell light-sheet super-resolution system of the present invention may have one or more following advantages:

(1) Fluorescence excitation may be performed on a sample with a thickness too large for use with conventional microscopy through the use of the epi-cone shell light-sheet super-resolution system of the present invention.

(2) When the fluorescent substances in the sample are excited, only fluorescent substances in a specific area may be excited, so that the fluorescent substances in other areas may still maintain fluorescence activity.

(3) Stereoscopic information of a sample may be obtained through the excitation of the different depth of the sample, and the costs for the device can be reduced through a simple structure.

(4) An objective lens with a higher numerical aperture may be used to capture better image resolution and quality through the epi-fluorescence microscope of the present invention.

DETAILED DESCRIPTION

To facilitate the review of the technique features, contents, advantages, and achievable effects of the present invention, the embodiments together with the drawings are described in detail as follows. However, the drawings are used only for the purpose of indicating and supporting the specification, which is not necessarily the real proportion and precise configuration after the implementation of the present invention. Therefore, the relations of the proportion and configuration of the attached drawings should not be interpreted to limit the actual scope of implementation of the present inventions.

The embodiments of epi-cone shell light-sheet super-resolution system of the present invention are to be explained with reference to the related drawings. For ease of understanding, the same elements in the following embodiments are to be explained in accordance with the same symbols.

Figure 1:
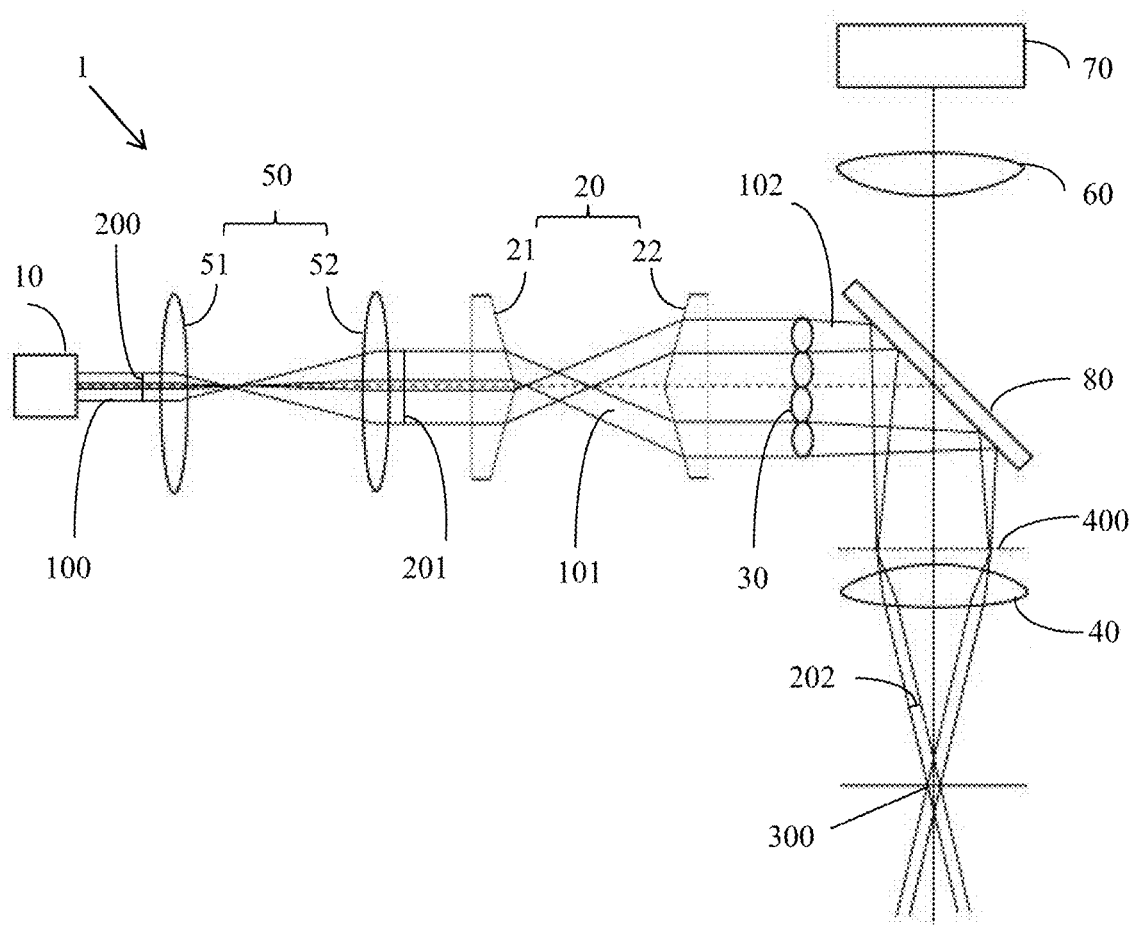
FIG. 1 depicts a structural schematic diagram of the epi-cone shell light-sheet super-resolution system according to one embodiment of the present invention.

Refer to FIG. 1, FIG. 1 depicts a structural schematic diagram of the epi-cone shell light-sheet super-resolution system applying to the confocal fluorescence microscope according to one embodiment of the present invention. An epi-microscope refers to a microscope using an eyepiece to observe the sample illuminated by the excitation light passing through the objective lens, and the excited light generated after the sample is excited being magnified by the same objective lens. The epi-cone shell light-sheet super-resolution system 1 of the present invention includes: a light-emitting element 10, a lens set 20, a micro-lens array 30, an objective lens 40, magnifying glass set 50, an eyepiece 60, an image-capturing device 70, and color separation filter 80.

The light-emitting element 10 emits a first excitation light 100 having a first width 200. To control the thickness of the ring-shaped light cone, a magnifying glass set 50 may be disposed on the optical path of the first excitation light 100. The magnifying glass set 50 may be formed by a first convex lens 51 and a second convex lens 52. After the first convex lens 51 refracts the first excitation light 100, the first excitation light 100 expanded to the second width 201 through the second convex lens 52 is collimated to obtain a first excitation light 100 having a second width 201. The lens set 20 may be formed by a first conical lens 21 and a second conical lens 22 with the conical surfaces facing each other. The first excitation light 100 is refracted into a ring-shaped excitation light 101 having a fixed thickness when passing through the first conical lens 21, and the ring-shaped excitation light 101 is collimated by the second cone lens 22. The first conical lens 21 and the second conical lens 22 have a first predetermined distance between thereof.

The collimated ring-shaped excitation light 101 then passes through the micro-lens array 30. This micro-lens array 30 may be arranged based on closest packing or chessboard packing. The chessboard packing is an upright and foursquare structure similar to a chessboard constituted by micro-lenses extended and arranged in two directions perpendicular to each other on a plane with each micro-lens adjacent to four micro-lenses. The closest packing is a hexagonal structure similar to a honeycomb constituted by each micro-lens adjacent to six micro-lenses, which refers to an arranging method that has the largest number of micro-lenses being packing on a plane. The micro-lens array 30 may focus the parallel light sources to form a plurality of second excitation lights 102 respectively, and the plurality of second excitation lights 102 are arranged in a ring shape and focused on the objective-lens back-focal plane 400. In the meantime, the diameter of the ring formed by the plurality of second excitation lights 102 is the same as that of the collimated ring-shaped excitation light 101.

Then, when passing through the objective lens 40, which is a convex lens, the plurality of second excitation lights 102 arranged in a ring shape may be refracted into cone-shaped excitation lights having a sample width 202 and focused on the sample position 300. With the focalization of the micro-lens array 30 to change the path of light by the characteristic of the convex lens of the objective lens, the sample width 202 of the cone-shaped excitation light remains fixed without different widths appearing at different positions on the optical path. This ensures that the beam at the sample position 300 may not be deformed, further ensuring that the intensity of the excitation light at the sample position 300 is sufficient to excite the fluorescent substances therein. After the excitation light arrives at the sample position 300, the fluorescent substances in the sample may be excited by the excitation light which exceeds the threshold value and begins illuminating fluorescence.

The fluorescence microscope including the epi-cone shell light-sheet super-resolution system 1 of the present invention may include an eyepiece 60 and an image-capturing device 70. The fluorescence generated after the sample is excited may be captured by the image-capturing device 70 when imaged via the eyepiece 60, so that the follow-up image process may proceed. The fluorescence microscope may also include a microstat that bears the sample and a regulating wheel configured to regulate the sample position. This fluorescence microscope may be a general microscope or a confocal microscope. A baffle plate having pinholes may be further include between the eyepiece 60 and the image-capturing device 70 to prevent the noise, which does not come from the objective-lens back-focal plane, from entering the image-capturing device 70, thus enhancing the clarity of the obtained image and acquiring a higher contrast ratio. In another embodiment of the present invention, the diameter of the ring-shaped excitation light 101 may be changed through regulating the first predetermined distance. The change in the diameter of the ring-shaped excitation light 101 may affect the position of the ring-shaped excitation light 101 passing through the micro-lens array 30 and further change the position of the sample position 300 after the follow-up focusing. For instance, when the first predetermined distance is shortened, the diameter of the ring-shaped excitation light 101 becomes small. The diameter of the ring formed by the plurality of second excitation lights 102 generated when focused through the micro-lens array 30 also becomes small. The sample position 300 that is focused after passing through the objective lens 40 may become much closer to objective lens 40.

In this epi-fluorescence microscope, because an objective lens with a higher numerical aperture may be selected as a lens for excitation and image capturing, the physical resolution of the image may be significantly enhanced. When used as a random localized optical recombination super-resolution microscope, the characteristic of the lens may significantly enhance the accuracy of localized points and resolution of recombined images.

In addition, the light-emitting element 10 may provide light sources of designated wavelengths or light sources filtered by a further included color filter for exciting various kinds of fluorescent substances or provide light having specific wavelength range. In another embodiment of the present invention, the light-emitting element 10 only emits single excitation light. A color filter may be disposed in the optical path of the excitation light to achieve an effect that corresponds to different fluorescent substances, for instance, disposed between the light-emitting element 10 and the magnifying glass set 50, disposed between the magnifying glass set 50 and the lens set 20, disposed between the lens set 20 and the micro-lens array 30, disposed on the micro-lens array 30 and the objective lens 40, and disposed on other suitable positions.

Figure 2:
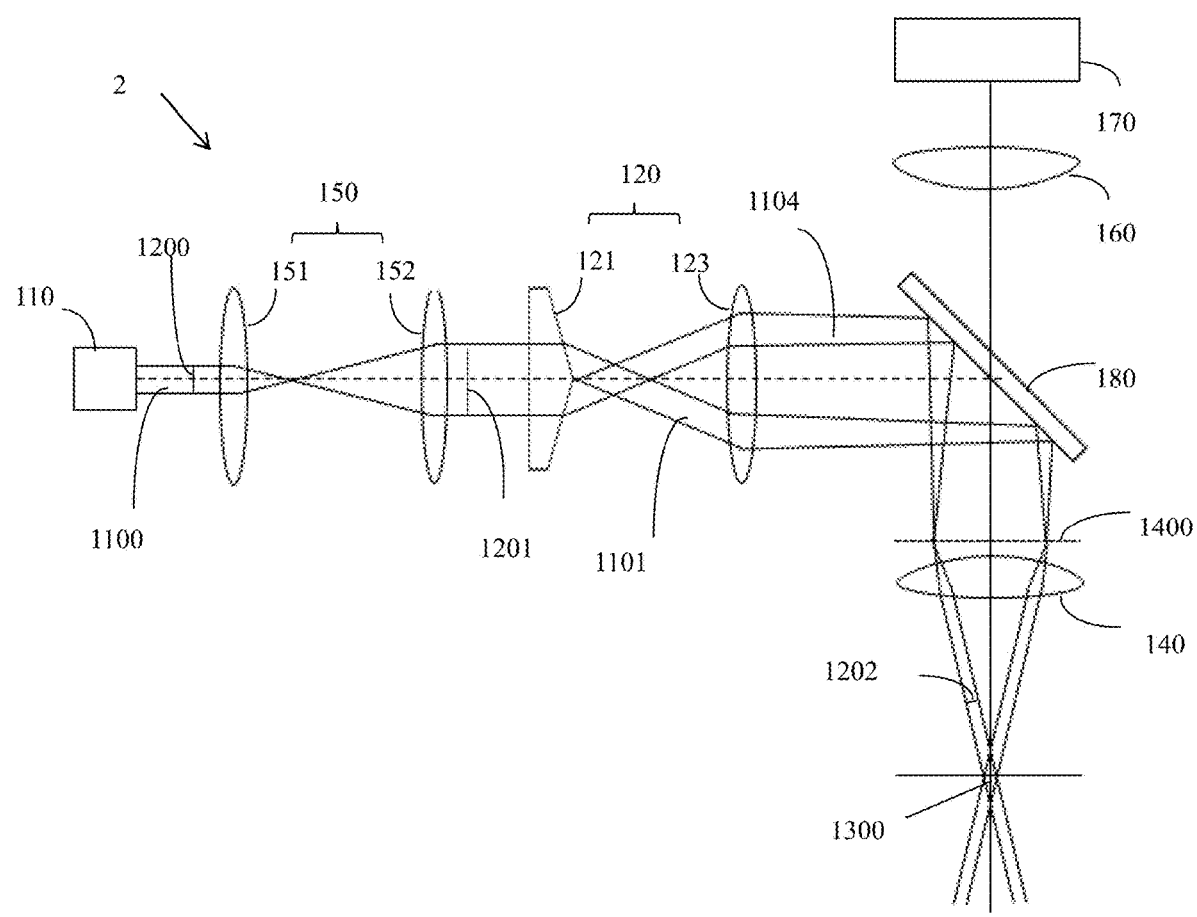
FIG. 2 depicts a structural schematic diagram of the epi-cone shell light-sheet super-resolution system according to another embodiment of the present invention.

Referring to FIG. 2, FIG. 2 depicts a structural schematic diagram of the epi-cone shell light-sheet super-resolution system 2 according to another embodiment of the present invention. In this embodiment, the third convex lens 123 may be used to replace the second conical lens 22 and the micro-lens array 30. The ring-shaped excitation light 1104 is focused as a thin line on the rear focusing surface of the third convex lens 123 through making the diameter of the ring-shaped light approximately equal to the rear aperture of the objective lens 140 by the first conical lens 121 and the third convex lens 123 having an appropriate spacing. The diameter of the ring-shaped light does not vary with the distance. In the meantime, the distance from the third convex lens 123 to the objective lens 140 must be the focal length of the third convex lens 123, and the diameter of the ring-shaped light also needs to be less than or equal to the rear aperture of the objective lens 140. Compared to the original embodiment, no limitation on other aspects may be found except for the mechanism limitation of the distance between the second conical lens 122 and the objective lens 140.

In one embodiment, the epi-cone shell light-sheet super-resolution system of the present invention applied to the confocal fluorescence microscope, and using a sample with thickness (an eye of a fruit fly) to illustrate the effect of the present invention as a practical example.

First, the sample is dyed with a fluorescence dye. Next, the sample is excited with fluorescence by respectively using a conventional excitation light beam and a light beam from the epi-cone shell light-sheet super-resolution system of the present invention. Afterward, the sample of the image is obtained using the confocal fluorescence microscope for the observation of the depletion of the fluorescent substances. To make the effect of the ring-shaped light cone of the present invention more obvious, the intensity of the excitation light is controlled to the intensity that may excite the fluorescent substances during excitation.

Figure 3:
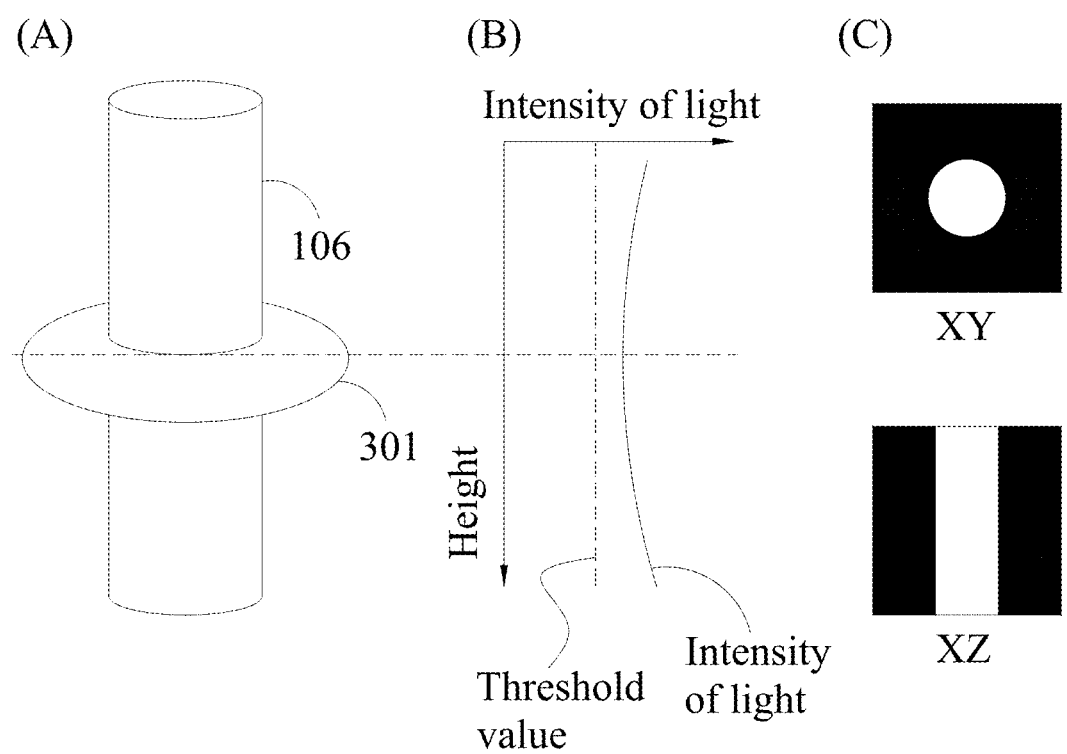
FIG. 3 depicts characteristics of the optical path of the conventional fluorescence microscope, wherein (A) depicts an optical path schematic diagram when the conventional fluorescence microscope illuminates the sample, (B) depicts a schematic diagram illustrating the intensity of the excitation light of the optical path at different heights corresponding to (A), and (C) depicts a schematic diagram illustrating the optical path at the XY and XZ sections.

FIG. 3 depicts characteristics of the optical path of the conventional fluorescence microscope. As shown in FIG. 3 (A), when the excitation light beam 106 in a cylindrical shape passes through the sample 301 with thickness, the intensity of the excitation light beam 106 applied to the fluorescent substances corresponding to the height as shown in FIG. 3 (A) is as shown in FIG. 3 (B), meaning that the intensity of the excitation light is greater than the threshold value regardless of the height. For FIG. 3 (C), the upper figure is a schematic diagram of the XY plane as a section, and the lower figure is a schematic diagram of the XZ plane as a section. When the excitation light beam 106 passes, the excited sample is distributed in a circle (white part) similar to the upper figure of FIG. 3 (C) which may be seen on any XY section on the Z-axis. In contrast, the excited sample distributed in a long strip (white part) similar to the lower figure of FIG. 3 (C) may be seen on the XZ section, meaning that the fluorescent substances in the sample which the entire light beam passes through in a cylindrical shape may all be excited.

Figure 4:
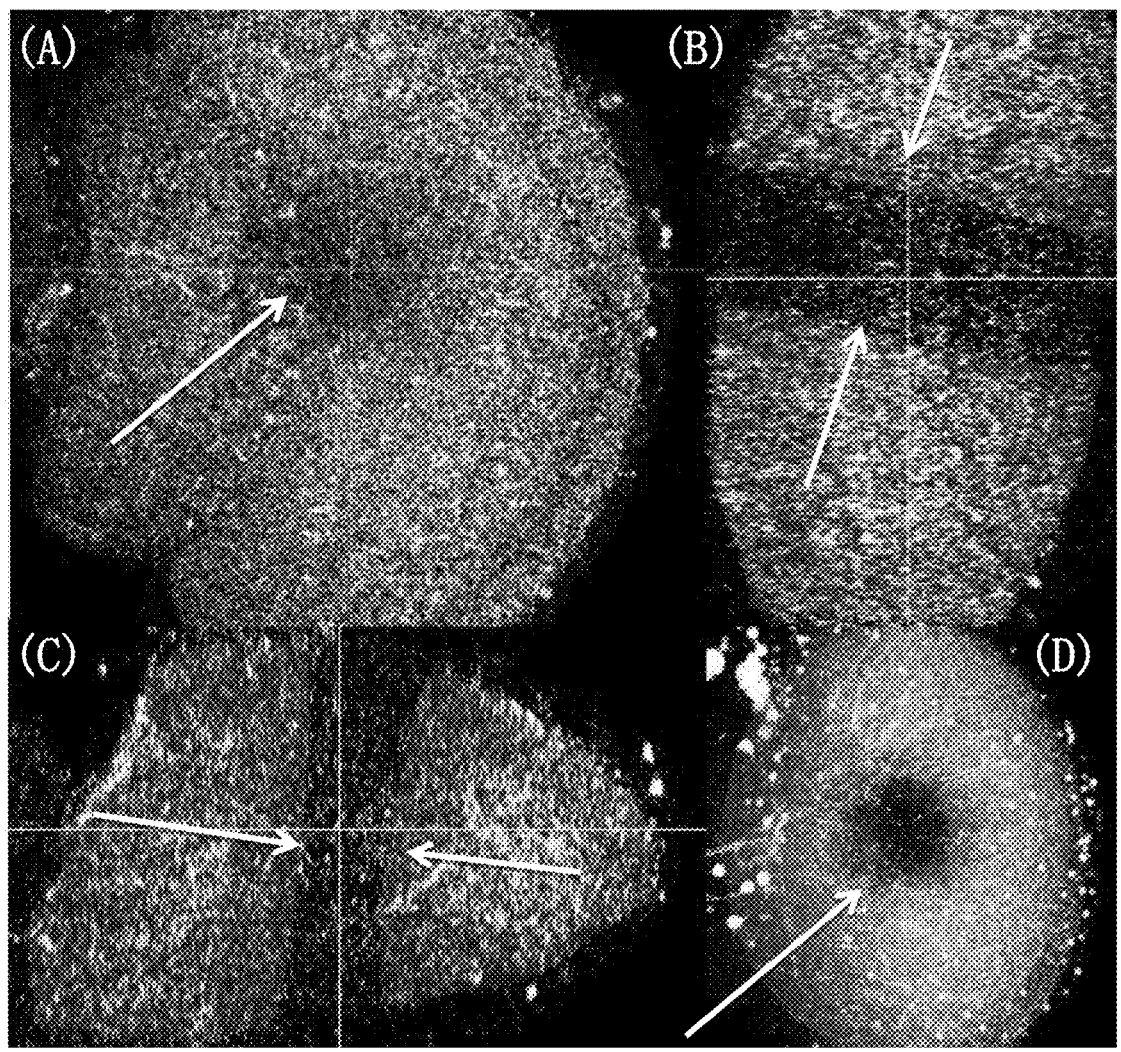
FIG. 4 is a photograph illustrating residual fluorescent substances after the optical path of the conventional fluorescence microscope applies to the sample.

FIG. 4 is a photograph illustrating the excitation of the entire sample after being excited by a conventional excitation light beam. It can be seen from FIGS. 4 (A) and (D) that a sign of a dim circle may be identified in the middle of the sample (as pointed by the arrow), indicating the practical example of the XY section as shown in the upper figure of FIG. 3. It can be seen from FIGS. 4 (B) and (C) that a sign of a dim long strip may be identified (as pointed by the arrow), indicating the practical example of the XZ section as shown in the lower figure of FIG. 3(C). This shows the evidence of the fluorescent substances of the sample on the path depleted by the conventional excitation light beam.

Figure 5:
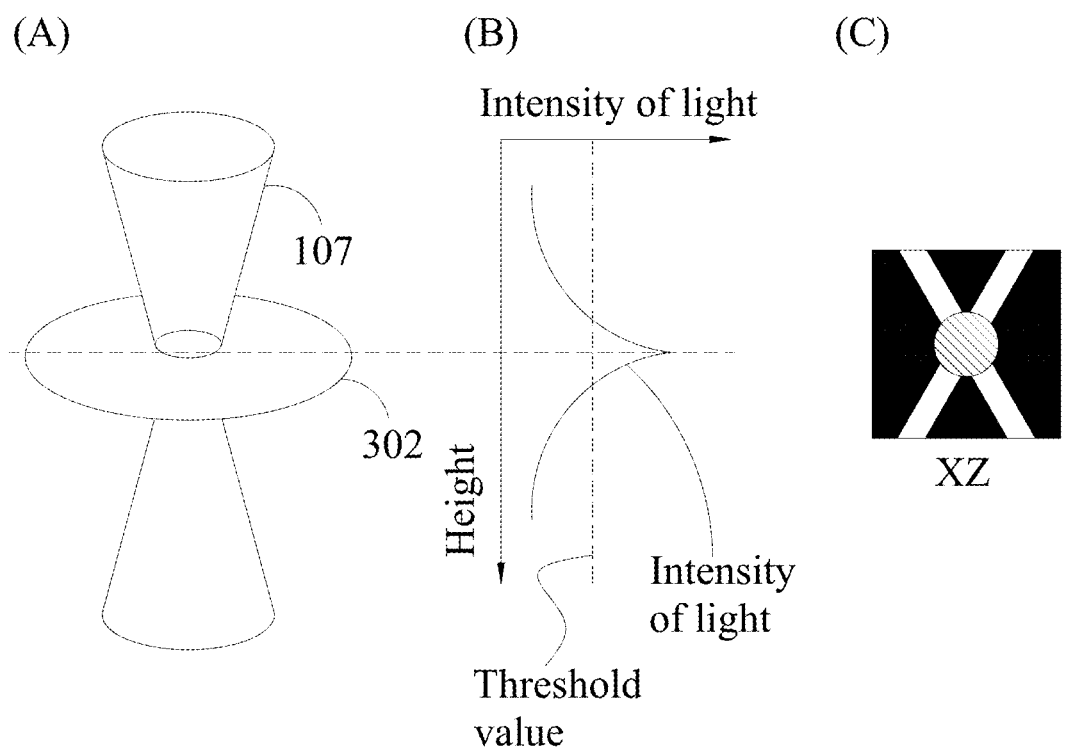
FIG. 5 depicts characteristics of the optical path of the epi-cone shell light-sheet super-resolution system according to the present invention, wherein (A) depicts an optical path schematic diagram when the epi-cone shell light-sheet super-resolution system of the present invention illuminates the sample, (B) depicts a schematic diagram illustrating the excitation light intensity of the optical path at different heights corresponding to (A), and (C) depicts a schematic diagram illustrating the optical path at the XZ section.

FIG. 5 depicts characteristics of the optical path of the epi-cone shell light-sheet super-resolution system of the present invention. FIG. 5 (A) depicts a schematic diagram illustrating the generated ring-shaped light cone 107 passing through the sample 302 with thickness. The excitation light passing through at different heights corresponding to the sample of FIG. 5 (A) is as shown in FIG. 5 (B). Since the intensity of single excitation light is substantially lower than the threshold value without exiting the fluorescent substances in the sample, only the intensity of the excitation light at the sample position (the intersection of the excitation light) may exceed the threshold value, thus exciting the fluorescent substances in the sample. Hence, the path (white part) of the ring-shaped light cone generated by the epi-cone shell light-sheet super-resolution system of the present invention may be as shown in FIG. 5 (C), which exhibits an X shape. Moreover, only the sample at the sample position (as in a circle twill) at the intersection of the ring-shaped light cone may be excited.

Figure 6:
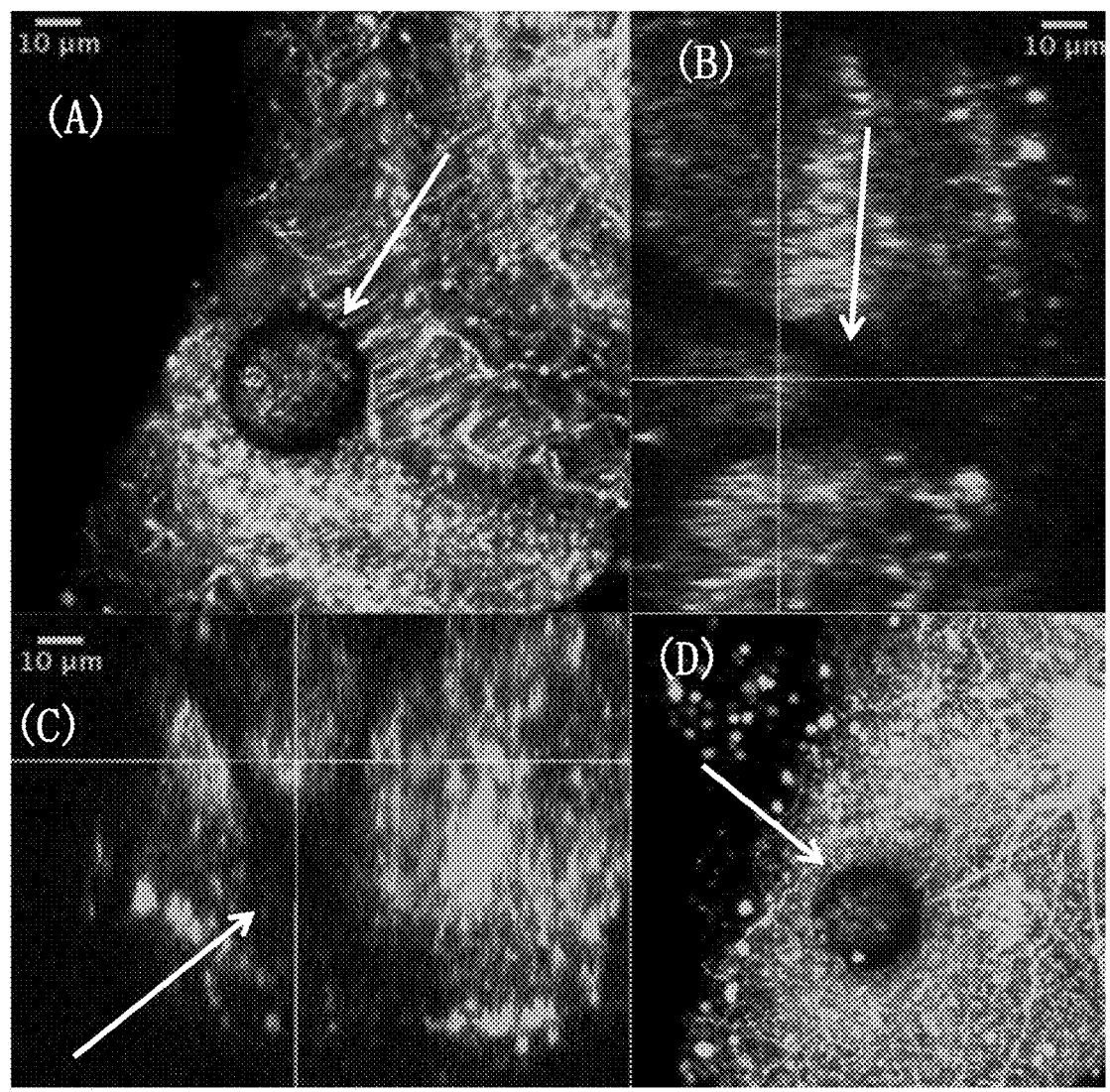
FIG. 6 is a photograph illustrating residual fluorescent substances after the optical path of the epi-cone shell light-sheet super-resolution system of the present invention applies to the sample.

FIG. 6 is a photograph illustrating the excitation of the entire sample after being excited by the excitation light from the epi-cone shell light-sheet super-resolution system of the present invention (for clarity, the intensity of the excitation light higher than the threshold value is used). It can be seen from FIGS. 6 (A) and (D) that a sign of a circle similar to a circle shape may be identified (as pointed by the arrow), showing the photograph of the XY section slightly lower than the sample position (away from the objective lens). This shows that after a part of the sample 302 being excited by the ring-shaped light cone of the present invention, the other part below thereof still has unexcited fluorescent substances which may be provided for excitation. In FIG. 6 (B), the direction of the light source travels from the right side to the left side. In FIG. 6 (C), the direction of the light source travels from the lower side to the upper side. A dim sign in an X shape may be indistinctly seen (as pointed by the arrow), and this X shape is the path through which the ring-shaped light cone passes at the XZ section, showing that the excitation light beam regulating system of the present invention may generate the ring-shaped light cone focused on a required location.

In this way, the sample on the image-capturing plane may be performed with the fluorescence excitation through the epi-cone shell light-sheet super-resolution system of the present invention. With the use of the image-capturing device capturing images and the Z-axis regulating mechanism, a stereoscopic image of a specified sample portion may be pieced together through image software.

The above description is merely illustrative rather than restrictive. Any spirit and scope without departing from the present invention as to equivalent modifications or alterations are intended to be included in the following claims.

What is claimed is:

1. An epi-cone shell light-sheet super-resolution system, comprising:
    a light source generating a first excitation light;
    a lens set formed by a plurality of lenses, and the lens set comprising a first lens and a second lens, wherein the first lens is a conical lens, the first lens is positioned between the light source and the second lens, the first lens is spaced apart from the second lens by a first predetermined distance, a conical surface of the first lens faces away from the light source and refracts the first excitation light into a ring-shaped excitation light with a fixed thickness, and the second lens focuses the ring-shaped excitation light to an objective lens back-focal plane;
    a color separation filter configured to reflect the ring-shaped excitation light; and
    an objective lens as a convex lens positioned between the objective-lens back-focal plane and a sample, expanding the focused ring-shaped excitation light to a sample width, and focusing the ring-shaped excitation light to a sample position,
    wherein an energy of the ring-shaped excitation light focused before the sample position is lower than an excitation threshold value, and a sum of the energy focused on the sample position is higher than the excitation threshold value.

2. The epi-cone shell light-sheet super-resolution system of claim 1, further comprising a magnifying glass set positioned between the light source and the lens set, formed by a pair of convex lenses, expanding the first excitation light from a first width to a second width, and collimating the first excitation light.

3. The epi-cone shell light-sheet super-resolution system of claim 1, wherein the second lens comprises a conical lens and a micro-lens array, and a conical surface of the conical lens of the second lens faces the first lens and illuminates the ring-shaped excitation light to the micro-lens array after collimation; the micro-lens array respectively focuses the ring-shaped excitation light by a plurality of micro-convex lenses in the micro-lens array to form a plurality of second excitation lights, the plurality of second excitation lights are arranged in a ring shape, and the focuses of the plurality of second excitation lights are positioned at the objective-lens back-focal plane.

4. The epi-cone shell light-sheet super-resolution system of claim 1, wherein the micro-lens array is arranged based on closest packing or chessboard packing.

5. The epi-cone shell light-sheet super-resolution system of claim 1, wherein the second lens is a convex lens.

6. The epi-cone shell light-sheet super-resolution system of claim 1, wherein the light source comprises a color filter configured to change a wavelength of the first excitation light.

7. A fluorescence microscope, comprising:
    an epi-cone shell light-sheet super-resolution system of claim 1;
    a microstat positioned at the sample position and bearing the sample;
    a regulating wheel configured to regulate a height of the microstat; and
    an eyepiece.

8. A fluorescence microscope, comprising:
    an epi-cone shell light-sheet super-resolution system of claim 3;
    a microstat positioned at the sample position and bearing the sample;
    a regulating wheel configured to regulate a height of the microstat; and
    an eyepiece.

* * * * *